United States Patent Office 3,318,929
Patented May 9, 1967

---

3,318,929
7α,17α-ALKYL ESTRADIOLS
Georg Anner and Jaroslav Kalvoda, Basel, and Peter Wieland, Oberwil, Basel-Land, Switzerland, assignors to Ciba Corporation, New York, N.Y., a corporation of Delaware
No Drawing. Filed Dec. 21, 1964, Ser. No. 420,186
Claims priority, application Switzerland, Dec. 24, 1963, 15,945/63; May 27, 1964, 6,914/64; Dec. 3, 1964, 15,656/64
2 Claims. (Cl. 260—397.5)

This invention relates to the manufacture of 7α,17α-dimethyl-estradiols of the formula (I)
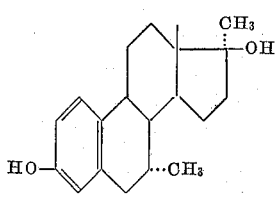

and its 3-methyl ether. These compounds have valuable pharmacological properties. In the castrated female rat, the 7α,17α-dimethyl-estradiol, when administered subcutaneously in the Allen-Doisy test (keratinization of the vagina), has eight times the estrogenic action of 17α-methyl-estradiol, and in the Bülbring-Burn test (growth of uterus), it has four times the estrogenic action of 17α-methyl-estradiol. On oral administration of 7α,17α-dimethyl-estradiol through a stomach tube to the castrated female rat in the Allen-Doisy test, a three times higher intensity of the estrogenic effect is observed than with 17α-methyl-estradiol. The new compounds can therefore be used as highly active estrogens.

The new compounds can be prepared in per se conventional manner, especially by aromatization of the ring A in a compound of the formula (II)
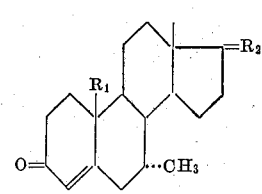

in which $R_1$ represents hydrogen, a free or esterified hydroxyl group or a methyl or hydroxymethyl group, and $R_2$ the group

or a substituent convertible thereinto, e.g. an oxygenated substituent, e.g. a free or functionally converted hydroxy group together with a hydrogen atom, or a free or functionally converted oxo group, and which compounds may contain another double bond in 1,2-position, and, if desired, by conversion into the group

of a substituent that is so convertible, and/or by conversion of the 3-hydroxy group into the methoxy group. Thus, for example, a 19-unsubstituted $\Delta^{1,4}$-3-oxo-7α-methyl-androstadiene of the above Formula II can be aromatized in ring A by pyrolysis. To this end, said starting material is heated in the presence or absence of a solvent or diluent, e.g. a mineral oil or acyclic hydrocarbon, such as 9,10-dihydrophenanthrene, for example to 200–600° C. Another method of aromatization consists in treating said 19-unsubstituted $\Delta^{1,4}$-3-oxo-7α-methyl-androstadiene with lithium and diphenyl in the presence of diphenyl methane as described in Journal of the American Chemical Society, 86, 742 (1964). Tetrahydrofuran is the preferred solvent used.

After aromatization, a substituent convertible into the group

is so converted in per se conventional manner, e.g. as described below, and/or if desired, the 3-hydroxy group is converted into a methoxy group, likewise in per se conventional manner.

The new compounds can also be obtained by pyrolysis of a $\Delta^4$-3-oxo-7α-methyl-10-acyloxy-19-norandrostene of the above Formula II and, if necessary, conversion of the 17-substituent into the group

and/or of the 3-hydroxy group into the methoxy group. In these starting materials, the acyloxy group is especially the acyloxy group of a carboxylic acid, e.g. of a lower aliphatic or aromatic carboxylic acid, e.g. acetic, trifluoracetic or benzoic acid. According to this method, the 10-acyloxy group is eliminated by heating the starting material, advantageously to a temperature above 80° C., preferably under reduced pressure, or by heating it for a short while in a high-boiling solvent or diluent, especially a hydrocarbon or ether, such as toluene, xylene, Tetralin, Decalin, dioxane, anisol or diethylene glycol dimethyl ether.

The new compounds can also be obtained by treating a $\Delta^{1,4}$-3-oxo-7α-methyl-19-hydroxy-androstadiene of the above Formula II with an acid or a base, and, if desired, converting the substituent in 17-position into the group

and/or the 3-hydroxy group into a methoxy group. As acids there are advantageously used mineral acids, such as hydrochloric acid, sulfuric acid or chlorosulfonic acid, or carboxylic acids, such as formic, acetic, or propionic acid, and as bases, e.g. alkali metal hydroxides, such as sodium or potassium hydroxide, or nitrogen bases, such as pyridine or dimethyl formamide. If one of the acid or basic agents mentioned is used that does not dissolve the starting material, the reaction is advantageously performed in a solvent, for example in a hydrocarbon, alcohol, ether or ketone, such as benzene, xylene, methanol, ethanol, dioxane or acetone.

Starting from a compound of the above Formula II in which $R_1$ represents a hydrogen atom, the new compounds can be prepared by treating with a dehydrogenating agent, preferably one that is capable of introducing double bonds in positions 1,2 or 1,2 and 4,5 or 10-methyl steroids, followed by conversion, if desired, of a substituent in 17-position into the grouping

and/or of the free hydroxyl group in 3-position into a 3-methoxy group. To the said dehydrogenating agents belong quinones, especially 2,3 - dichloro-5,6 - dicyanobenzoquinone or chloranil, or selenious acid and its derivatives such as selenium dioxide or dibenzoyloxy selenium oxide. This dehydrogenation is performed in the usual manner, for example in a solvent, advantageously in an ether or alcohol, such as diethyl ether, dioxane, tetrahydrofuran, ethanol or tertiary butanol, and advantageously at an elevated temperature. Alternatively, the said starting compounds may be treated with micro-organisms capable of introducing a double bond in the 1,2-position of a steroid, e.g. with *Corynebacterium simplex, Didymella lycopersica, Bacillus subtilis* or *Septomyxa affinis*. If necessary, this treatment is followed by conversion of the 17-substituent as said above or of the 3-hydroxyl group into a methoxy group according to known methods.

Another method of producing the new compounds of this invention consists in causing an acid to act on a $\Delta^4$-3-oxo-6$\beta$-halogen-7$\alpha$-methyl-19-nor-androstene of the formula (III)

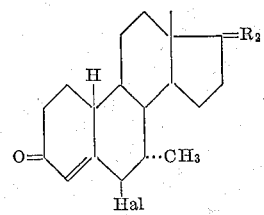

in which $R_2$ has the meaning given above, and Hal stands for halogen, especially bromine, and if desired or required converting the 17-substituent into the group

and/or the 3-hydroxy group into a 3-methoxy group. It is of advantage to use strong acids, especially mineral acids, e.g. those mentioned above. This reaction can be performed in one of the aforementioned solvents. Particularly favorable results are obtained when the reaction is performed with hydrochloric acid in acetone.

Furthermore, the new compounds can be prepared from a $\Delta^{1,4,9(11)}$-3-oxo-7$\alpha$-methyl-androstatriene of the formula (IV)

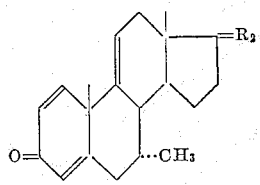

in which $R_2$ has the meaning given above, by treatment with zinc and hydrogenation of the $\Delta^{1,3,5(10)9(11)}$-3-hydroxy-7$\alpha$-methyl-estratetraene formed and, if desired, conversion of the 17-substituent into the group

and/or the 3-hydroxy group into the 3-methoxy group. Alternatively, hydrogenation may follow the last-mentioned conversions. The treatment with zinc is advantageously performed in aqueous pyridine, e.g. pyridine + water (9:1) or an alkanol or glycol, such as ethanol or ethylene glycol. For the hydrogenation it is of advantage to use catalytically activated or nascent hydrogen, e.g. hydrogen and palladium catalysts or sodium or potassium in liquid ammonia.

Finally, the new compounds can also be prepared by the following new methods which permits of the stereospecific introduction of the 7$\alpha$-methyl group. It consists in reacting the 6,7$\beta$ - epoxide of a 3,17-dioxygenated $\Delta^{1,3,5(10)}$-estratriene of the formula (V)

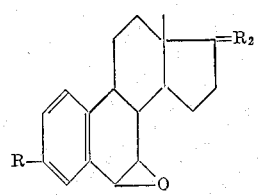

in which R represents a free or functionally converted, e.g. esterified or etherified, hydroxy group, and $R_2$ has the meaning given above, with a methyl metal compound, e.g. a methyl magnesium halide, especially methyl magnesium bromide or iodide, or with lithium methyl, eliminating the hydroxy group from the resulting 6-hydroxy-7$\alpha$-methyl compound, if desired after esterification of the latter, and, if desired, converting the group in 17-position into the group

and/or a free or functionally converted 3-hydroxy group into a methoxy group or into a free hydroxy group. This reaction with the methyl magnesium halide is advantageously performed in an ether, such as diethyl ether, tetrahydrofuran or dioxan, or an aromatic hydrocarbon, such as benzene. The hydrogenolytic elimination of the hydroxy group from the 6-hydroxy-7$\alpha$-methyl compound is advantageously performed with catalytically activated or nascent hydrogen. The 6-hydroxy group may also be esterified, for example with a reactive, functional derivative of a carboxylic or sulfonic acid, e.g. one of those mentioned above, and then split off hydrogenolytically, e.g. with Raney nickel.

A substituent, e.g. an oxygenated substituent, present in 17-position and convertible into the group

is, for example, a free or functionally converted hydroxy or oxo group. A functionally converted hydroxy group in 3-or 17-position is, for example, a hydroxy group esterified with a carboxylic acid, e.g. one having at most 20 carbon atoms, e.g. formic, acetic, propionic, butyric, valeric, caproic, trimethylacetic, undecylenic, cyclopropylcarboxylic, cyclopentylcarboxylic, cyclohexylacetic, phenylacetic, phenylpropionic, phenoxyacetic, acetoacetic, diethylaminoacetic, glycollic, bisglycollic, asparaginic, benzoic, ortho-sulfobenzoic, furan-2-carboxylic, or nicotinic acid, or methane, ethane, benzene, or toluene sulfonic acid, or a hydroxy group etherified with a lower aliphatic alcohol, such as methyl or ethyl alcohol, an araliphatic alcohol, such as benzyl alcohol, or a heterocyclic alkanol, such as tetrahydropryanol; a functionally converted oxo group is, for example, a ketalized oxo group, an oxime or hydrazone group.

The conversion of a 17-oxygenated substituent into the group

in all of the above methods follows the known pattern. Thus, an esterified or etherfiied hydroxy group in 17-position can be split, e.g. hydrolytically or hydrogenolytically, and a free 17-hydroxy group so obtained can be converted into the oxo group in known manner, if desired, after functional conversion of a free 3-hydroxy group. For this dehydrogenation there are used, for example, derivatives of hexavalent chromium, e.g. chromic acid, or the Oppenauer method is employed with an aluminum alcoholate in the presence of a ketone in solution in benzene. A ketalized oxo group can be liberated, for example, by acid hydrolysis. In a resulting 17-oxo compound, the methyl group can be introduced in known manner, if desired, after prior conversion of a 3-hydroxy group into an ether or ester group, for example with a methyl metal compound, e.g. methyl magnesium bromide or iodide or lithiummethyl in ether or tetrahydrofuran.

The greater part of the starting materials are known. New starting materials can be prepared by known methods. The $\Delta^4$-3-oxo-7$\alpha$-methyl compounds of the androstane or 19-nor-androstane series of the above Formulae II, III and IV, for example, can be prepared from the corresponding 7-unsubstituted Δ⁴,⁶-3-oxo-androstadienes or -19-nor-androstadienes by treatment with methyl magnesium iodide in the presence of copper-I-chloride or copper-II-acetate, followed by hydrolysis. The resulting products can be dehydrogenated in 1,2-position with selenium dioxide or quinones, especially 2,3-dichloro-5,6-dicyanobenzoquinone, in alcohols, such as tertiary butanol or tertiary pentanol, or with enzymes of fungi of the genus Fusarium, Didymella, Corynebacterium or *Bacillus subtilis* or *sphaericus*, or they can be hydroxylated in 19-position, if desired, before or after dehydrogenation, with enzymes of fungi of the genus Corticium or Pericularia. Δ⁴-3-oxo-7α-methyl-10-acyloxy-19-nor-androstenes can be prepared by reacting Δ⁴-3-oxo-7α-methyl-19-hydroxy-androstenes with lead tetraacylates, especially lead tetraacetate, in nonpolar solvents, such as benzene or cyclohexane. Δ⁴ - 3 - oxo - 6β - halogen - 7α - methyl-19-nor-androstenes can be obtained from 3-enol ethers of said Δ⁴-3-oxo-7α-methyl-19-nor-androstenes by reacting them with N-halogencarboxylic acid amides or imides, such an N-bromo-acetamide or N-bromo-succinimide.

The 6,7β-epoxides of the Formula V used in the new process can be obtained from the corresponding Δ¹,³,⁵(¹⁰),⁶-estratetraenes by reaction with N-halogen-carboxylic acid amides or imides, e.g., those mentioned above, and treatment of the resulting 6,7-halohydrins with alkalis, advantageously with potassium hydroxide in aqueous dioxane. Any oxo groups present in the starting materials may, if desired, be ketalized in known manner, for example, with lower alkanols and glycols, such as methanol or ethylene glycol.

The new compounds can be used as medicaments in the form of pharmaceutical preparations containing them in admixture or conjunction with a pharmaceutical, organic or inorganic, solid or liquid carrier suitable for enteral, e.g., oral, or parenteral administration. Suitable carriers are substances that do not react with the new compounds, for example, water, gelatine, lactose, starches, magnesium stearate, talcum, vegetable oils, benzyl alcohols, gums, polyalkylene glycols, cholesterol or other know medicinal carriers. The pharmaceutical preparations may be, for example, tablets, dragées of capsules, or in liquid form solutions, suspensions or emulsions. They may be sterilized and/or may contain assistants, such as preserving, stabilizing, wetting or emulsifying agents, salts for regulating the osmotic pressure or buffers. They may additionally contain other therapeutically valuable substances.

In these pharmaceutical preparations the amount of the active estrogenic substance is preferably within the dose range of 0.002 mg. and 0.015 mg. per unit dose.

The following examples illustrate the invention.

EXAMPLE 1

200 mg. of 7α-methyl-estrone, dissolved in 15 ml. of absolute tetrahydrofuran, are added dropwise with stirring to 10 ml. of a 3-molar solution of methyl-magnesium chloride in ether. The reaction mixture is refluxed for 1 hour, then cooled to —10° C., carefully treated with 10 ml. of a saturated ammonium chloride solution, and diluted with ether. The aqueous layer is separated, extracted with ether, the organic layer washed with ice-cold dilute sulfuric acid, dilute sodium bicarbonate solution, and water, dried, and evaporated under a water-jet vacuum. According to the IR spectrum and the thin-layer chromatogram (eluant: a 4:1 mixture of benzene and ethyl acetate), the crude product so obtained (240 mg.) still contains about 10% of 7α-methyl-estrone. Several recrystallizations from benzene+methylene chloride-ether yield 130 mg. of pure Δ¹,³,⁵(¹⁰)-3,17β-dihydroxy-7α,17α-dimethyl-estratriene of melting point 196 to 198° C. IR spectrum: bands inter alia at 2.79, 3.05, 6.20, 6.36, 6.68, 8.70, 9.43 and 10.75μ. The compound dissolves sparingly in pure methylene chloride, ether or benzene, and relatively easily in mixtures of these solvents or in methanol.
The starting material is prepared as follows:

To a solution of 250 mg. of lithium in a mixture of 4.6 g. of diphenyl and 25 ml. of tetrahydrofuran are added 0.55 ml. of diphenylmethane and 1 g. of 3-oxo-7α-methyl-17-ethylenedioxy-Δ¹,⁴-androstadiene, which are rinsed in with 5 ml. of tetrahydrofuran. The mixture is boiled and stirred for 2 hours under a current of nitrogen, then cooled with a mixture of ice and methanol, and treated with 2.5 g. of ammonium chloride. The solution discolors. 10 minutes later, it is treated with 7.5 ml. of water and with benzene. It is then washed with a dilute solution of sodium chloride, extracted with benzene, dried, and evaporated under vacuum. The residue is treated with 30 ml. of 90% acetic acid and the flask filled with nitrogen and heated from 60° to 80° C. in the course of 25 minutes. The batch is then evaporated under reduced pressure, and this operation repeated once with benzene. The residue is chromatographed over 30 g. of alumina (activity II). The 7α-methyl-estrone is eluted with benzene. Recrystallization from a mixture of methylene chloride and ether results in 350 mg. of the product. It melts at 233 to 236° C. and its mixed melting point with authentic material shows no lowering, and the IR spectrum is identical with that of authentic material.

EXAMPLE 2

0.2 ml. of a solution of 0.25 ml. of concentrated sulfuric acid in 5 ml. of dioxane is added to a solution of 500 mg. of Δ⁴-3-oxo-7α-methyl-17β-acetoxy-19-norandrostrene in 4 ml. of absolute dioxane, 0.8 ml. of orthoformic acid ethyl ester and 0.04 ml. of absolute ethanol, and the whole is stirred for 20 minutes at 20° C. 0.5 ml. of pyridine is then added and the solution is evaporated under a water-jet and a high vacuum; the residue is mixed with water and ether, and the organic layer is once more washed with water, dried and evaporated under a water-jet vacuum, to yield 590 mg. of a yellow oil which, on chromatography on neutral alumina (activity II), yields 303 mg. of crystalline Δ³,⁵-3-ethoxy-7α-methyl-17β-acetoxy-19-norandrostadiene. The infrared spectrum of this compound contains, inter alia, bands at 5.80, 6.00, 6.15, 8.03, 8.10, 9.60 and 9.75μ. It is dissolved without previous purification in 10 ml. of acetone, mixed with a solution of 180 mg. of sodium acetate in 1.3 ml. of water, cooled to about —15° C., 255 mg. of N-bromosuccinimide and 0.2 ml. of glacial acetic acid are added, and the batch is stirred for 2 hours at —15° C. to —20° C. A solution of 300 mg. of potassium iodide in 1.5 ml. of water and then 400 mg. of sodium thiosulfate in 2 ml. of water are added, the mixture is diluted with ether, the organic layer is washed with water, dried and evaporated under a water-jet vacuum. The resulting crude Δ⁴-3-oxo-6-bromo-17β-acetoxy-19-norandrostene is dissolved in 5 ml. of acetone, mixed with 2 drops of concentrated hydrochloric acid and refluxed for 2 hours. Conventional working up yields amorphous 7α-methyl-estradiol-17-acetate whose infrared spectrum contains bands, inter alia, at 2.82, 5.80, 6.20 (6.32), 6.68, 8.07, 9.60 and 9.75μ.

1.7 g. of the compound so obtained are dissolved in a mixture of 4 ml. of dihydropyran and 4 ml. of tetrahydrofuran. 0.1 ml. of phosphorus oxychloride is added to the solution, which is then left to itself for 15 minutes with exclusion of moisture. The reaction solution is then poured on to 100 ml. of ice+water and 35 ml. of saturated sodium bicarbonate solution, and the mixture is extracted with ether. The organic layer is washed neutral with water, dried, and evaporated under a water-jet vacuum. The resulting colorless oil (2.10 g.) is then dissolved in methylene chloride and filtered through 30 times its weight of alumina (activity I). In the IR spectrum, the resulting Δ¹,³,⁵(¹⁰)-3-tetrahydropyranyloxy-7α-methyl-17β-acetoxy-estratriene (1.76 g.) exhibits bands at 5.78, 6.23, 6.71, 8.20, 9.00, 9.74, 9.85 and 10.40μ. It is hydrolyzed without being first purified. To this end, it is dissolved in 100 ml. of methanol, and a solution of 2.94 g. of potassium carbonate in 10 ml. of water added, he mixture then stirred, and boiled for 15 hours under reflux. The reaction mixture is then cooled, poured into 350 ml. of water while stirring vigorously, the crude crystalline product is filtered off with suction, washed with water, dissolved in ether, and the solution shaken once with water, dried, admixed with 3 to 5 drops of pyridine, and evaporated under a water-jet vacuum. The resulting crude, crystalline $\Delta^{1,3,5(10)}$-3-tetrahydropyranyloxy-7α-methyl-17β-hydroxy-estratriene (1.52 g.) is dissolved in 15 ml. of acetone, the solution cooled to 0° C., treated, while being stirred and cooled, with 1.3 ml. of an 8 N-chromic acid solution in dilute sulfuric acid and, after about 1 minute, with 3 g. of sodium acetate. The reaction mixture is then diluted with water and ether, the aqueous layer separated, and extracted with ether. The organic solution is washed neutral with ice-cold sodium bicarbonate solution and water, dried, and evaporated under a water-jet vacuum. The resulting crude product yields on recrystallization from methylene chloride ether and chromatography of the mother liquors a total of 1.10 g. of pure 7α-methyl-estrone-3-tetrahydropyranyl ether of melting point 157 to 159° C.; (IR spectrum: bands, inter alia, at 5.78, 6.24, 6.72, 8.36, 8.93, 9.35, 9.66 and 10.34μ).

When the tetrahydropyranyl ether of 7α-methyl-estrone (500 mg.) in 20 ml. of ether is added dropwise to a solution of an excess of methyl magnesium iodide in ether and the mixture refluxed for 2 hours, there is obtained after the usual working up, the crude 3-tetrahydropyranyl ether of 7α,17α-dimethyl-estradiol in an 85% yield. Short heating of the latter with 66% acetic acid, working up, and crystallization of the crude product yields the free 7α,17α-dimethyl-estradiol of melting point 196 to 198° C.

EXAMPLE 3

A Grignard solution, prepared from 720 mg. of magnesium chips and 2.5 ml. of methyl iodide in 5.0 ml. of ether, is treated with a solution of 800 mg. of 7α-methyl-estrone-3-methyl ether in 6.0 ml. of absolute tetrahydrofuran and 20 ml. of ether, then diluted with 70 ml. of ether and refluxed and stirred for 4 hours. The mixture is cooled to about −5° C. and then treated carefully, while being cooled, with 20 ml. of saturated ammonium chloride solution, then diluted with ether+methylene chloride, the aqueous layer separated, and extracted, the organic solution washed neutral with water, dried, and evaporated under a water-jet vacuum. The resulting crude product (800 mg.) is chromatographed on 40 times its weight of alumina (activity II). The fractions eluated with a 4:1 and 1:1 mixture of petroleum ether and benzene, and with benzene are united and recrystallized twice from ether+methanol. There are obtained 376 mg. of pure $\Delta^{1,3,5(10)}$-3-methoxy-7α,17α-dimethyl-17β-hydroxy-estratriene melting and decomposing at 72 to 74° C. (crystal solvent). IR spectrum: bands inter alia at 2.77, 6.21, 6.35, 6.66, 8.10, 9.20, 9.62 and 10.73μ;

$$[\alpha]_D^{20} = +32° \pm 4° \text{ C. (c.}=0.234)$$

The compound used as starting material is prepared as follows:

To a suspension, cooled to −10° C. of 2.5 g. of 7α-methyl-estrone in 12 ml. of methanol and 8.5 ml. of methylene chloride is added while stirring in the course of 30 minutes a solution of 1.50 g. of sodium hydroxide in 3.0 ml. of water. In the course of another 90 minutes 3.60 ml. of dimethyl sulfate are added dropwise to the reaction solution. The mixture is treated with a solution of 1.80 g. of sodium hydroxide in 4 ml. of water and then, in the course of 30 minutes, with another 3.0 ml. of dimethyl sulfate. The methylene chloride present is then evaporated off under a water-jet vacuum, water is added to the reaction mixture, which is then cooled, and the precipitated product is filtered off, washed with water, dissolved in a 4:1 mixture of ether and methylene chloride, the solution washed neutral with water, dried and evaporated under a water-jet vacuum. 2.5 g. of the crude 3-methyl ether of 7α-methyl-estrone (melting at 151–152° C.) are obtained. On recrystallization from methylene chloride+methanol, a preparation melting at 161 to 162° C. is obtained. IR spectrum: bands inter alia at: 5.74, 6.20, 6.29, 6.65, 8.10, 8.30, 9.30 and 9.48μ;

$$[\alpha]_D^{16} = 144° \text{ C.} \pm 2° \text{ (c.}=0.477\%)$$

EXAMPLE 4

*Pharmaceutical preparations containing 7α,17α-dimethyl-estradiol or its 3-methyl-ether*

(a) A tablet containing 0.003 mg. 7α,17α-dimethyl-estradiol to be used as estrogenic preparation

| Ingredients: | Mg. |
|---|---|
| 7α,17α-dimethyl-estradiol | 0.003 |
| Lactose | 60.00 |
| Wheat starch | 20.00 |
| Colloidal silicic acid with hydrolysed starch | 5.00 |
| Talc | 5.00 |
| Magnesium stearate | 0.50 |
| Arrowroot | 9.497 |
| | 100.00 |

(b) A tablet containing 0.015 mg. of the 7α,17α-dimethyl-estradiol-3-methyl ether to be used as estrogenic preparation

| Ingredients: | Mg. |
|---|---|
| 7α,17α-dimethyl-estradiol-3-methyl ether | 0.015 |
| Lactose | 50.00 |
| Wheat starch | 30.00 |
| Gelatine | 1.00 |
| Talc | 5.00 |
| Magnesium stearate | 0.5 |
| Arrowroot | 13.485 |
| | 100.00 |

*Preparation.*—The mixture of the active ingredients, lactose and wheat starch is moistened with a solution containing the colloidal silicic acid or the gelatine to form a slightly plastic mass and then granulated in the usual manner. After being dried at 40° the mass is brought into the usual grain size by being passed through a sieve. Arrowroot, magnesium stearate and talc are added to the dried mass and the mixture is then compressed into tablets of 7 mm. diameter.

(c) 1000 linguettes each containing 0.003 mg. 7α,17α-dimethyl-estradiol

| Ingredients: | G. |
|---|---|
| 7α,17α-dimethyl-estradiol | 0.003 |
| Lactose | 100.00 |
| Saccharose | 229.997 |
| Stearic acid | 3.00 |
| Talc | 17.00 |
| | 350.00 |

*Procedure.*—The mixture of the active substance with lactose is moistened with an aqueous solution of saccharose and granulated in the usual manner. After being dried, the sieved granulate is mixed with stearic acid and talc and then compressed into linguettes.

(d) 100 oil ampoules each containing 0.005 mg. of 7α,17α-dimethyl-estradiol.

Ingredients:
7α,17α-dimethyl-estradiol _____ g__ 0.0005
Benzyl alcohol _____ ml__ 10.00
Sesame oil, ad. 100 ml.

*Procedure.*—The active ingredient is disssolved in benzyl alcohol and the stirred solution diluted with hot sterilized sesame oil. 1 ml. of this solution containing the ingredients in the above amounts is filled in ampoules which are sterilized at 160° C. for 1.5 hours.

What is claimed is:
1. The 7α,17α-dimethyl-estradiol of the formula

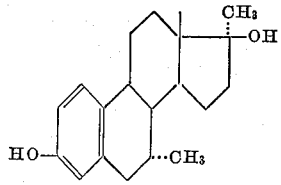

2. The 3-methyl ether of 7α,17α-dimethyl-estradiol.

References Cited by the Examiner

FOREIGN PATENTS 723,697   2/1955   Great Britain.

OTHER REFERENCES

Campbell et al.: "Steroids," vol. 1, pp. 317–24, March 1963.

LEWIS GOTTS, *Primary Examiner.*

HENRY A. FRENCH, *Assistant Examiner.*